Patented Sept. 27, 1927.

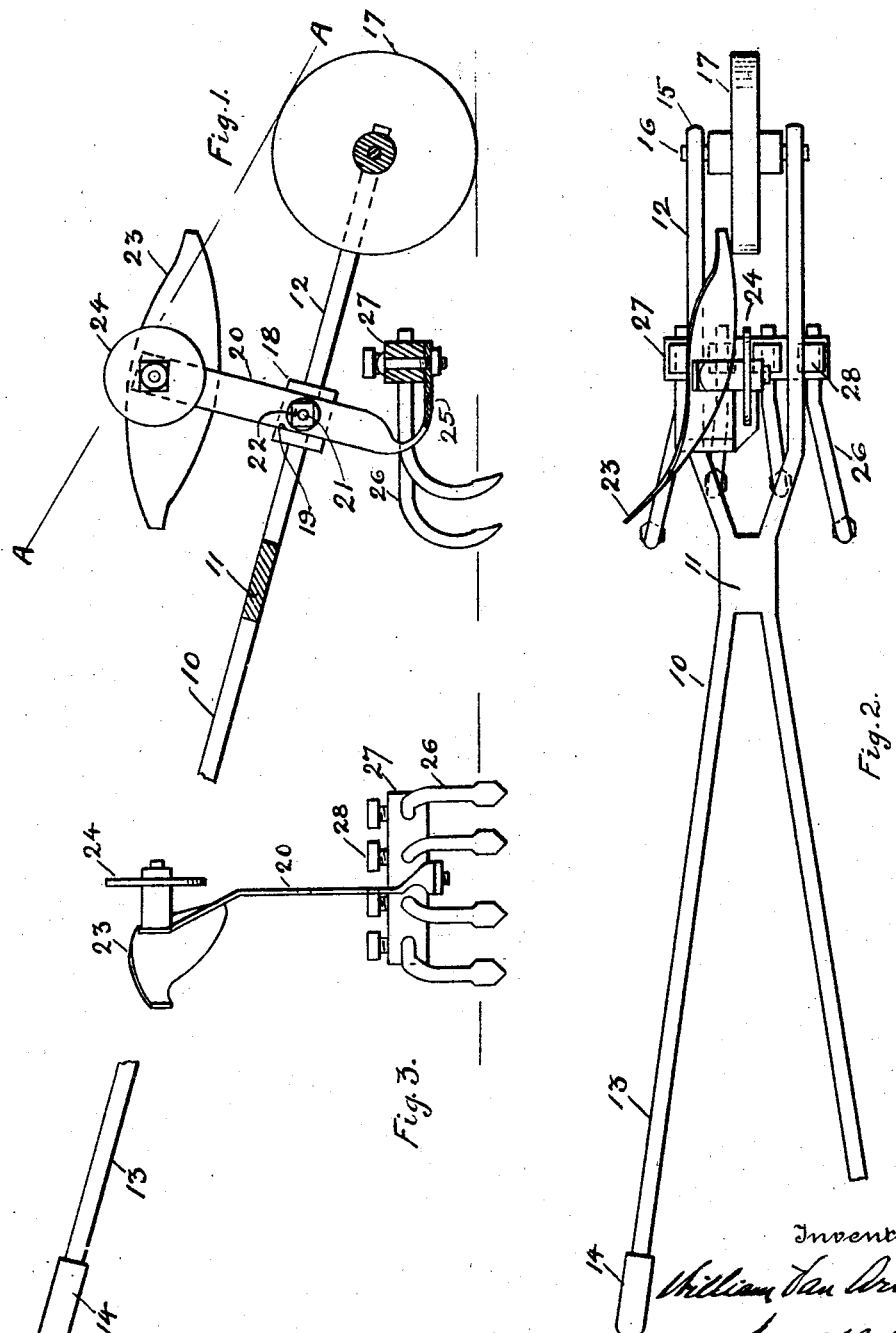

1,643,567

UNITED STATES PATENT OFFICE.

WILLIAM VAN ARSDALE, OF AUBURN, NEW YORK.

COMBINED PLOW AND CULTIVATOR.

Application filed March 11, 1927. Serial No. 174,610.

The present invention relates to an agricultural or gardening implement intended to facilitate the plowing and cultivation of the soil by hand.

The main object of the invention is to so construct the implement that by simply inverting the same, and without any special setting or change of parts, it will be instantly converted from a plow to a cultivator and vice versa. In other words, the operator has merely to turn the implement upside down when he desires to change from plowing to cultivating the soil.

For this reason the implement is provided with a detachable and adjustable supporting bar which at one end carries a plowshare and at its opposite end a set of cultivator hooks or teeth.

This has the advantage over known gardening implements of this class that, when a change in the character of operation is desired, no exchange of loose parts is necessary, or the carrying of tools to accomplish this.

In the accompanying drawing one embodiment of the invention is illustrated, and

Figure 1 shows a vertical section of the combined plow and cultivator;

Figure 2 a top plan view of Figure 1, and;

Figure 3 is a rear elevation of the plowshare and cultivator with fixtures.

In the drawing reference numeral (10) represents the frame preferably consisting of two long rods rigidly connected near the middle as at (11) and providing a pair of forward shanks (12) and a pair of rearward shanks (13) terminating with handles (14). The ends (15) of the forward shanks (12) provide bearings for a spindle (16) upon which the carrying wheel (17) is mounted to revolve freely.

At a suitable distance from the wheel (17) a guide or carrier (18) is rigidly secured on one of the forward shanks (12). This guide has a guide groove (19) in which the supporting bar (20) fits snugly to permit a displacement in longitudinal direction thereof for up and down adjustment of the bar. A securing element is provided for the bar such, for instance, as a bolt (21) preferably fixed in the guide and engaging in a slot in the bar (20) and provided with a clamping nut (22).

At one end of the bar (20) is rigidly mounted a plowshare (23) which is curved in the usual manner for cutting and turning over the sod. On one side of the share is mounted a cutting and guiding disk (24) adapted to revolve in the same vertical plane as the wheel (17) or parallel thereto. By adjusting the bar in vertical direction by means of the clamp nut (22), the depth of the cut performed by the plowshare may be regulated.

At the opposite end of the supporting bar (20), which for that purpose may be bent forward as at 25, is detachably mounted a cultivator provided with four or more teeth (26) of the usual hooked shape with pointed and flattened ends. The teeth which may be of different lengths are held in the block (27) adjustably by means of set screws (28) and the block itself is bolted to the bent end (25) of the bar (20). The teeth (26) are interchangeable and the cultivator is adjustable up and down in the same manner and by the same means as already described with regard to the plowshare.

It will be evident that other attachments than a plow and a cultivator may be carried on the supporting bar such, for instance, as a weeder, a shovel or the like.

The operation of this combined cultivator and plow is very simple. The operator pushes it along the ground while firmly gripping the handles (14) with, for instance, the cultivator undermost, as seen in Figure 1. When the plowshare is needed, all the operator has to do is to turn the machine upside down and proceed with the plowing, the line A—A then representing the ground.

It is to be understood that my invention as here disclosed is not limited to the details of construction shown and described and that these may be varied widely without departing from the spirit of the invention as disclosed by the claims.

I claim:

1. In an invertible device of the class described, the combination of a cultivator implement and a supporting frame therefor; said implement comprising an L-shaped bar mounted on the frame and cultivating members on said arms situated on opposite sides of the frame in such relative positions that one of said members is operative while the other member is idle, and means for adjustably securing the long arm in substantially perpendicular direction of the frame.

2. In an invertible device of the class described, the combination of a cultivator implement and a wheeled supporting frame therefor, both ends of said frame being bifurcated from its solid middle portion, one end forming a handle member and the other end providing bearings for a supporting wheel; said implement comprising an L-shaped bar having a short and a long arm and cutting members secured to the ends of said arms in such relative positions that one of said members is operative while the other is idle, a guide on the frame for said long arm and means for adjusting the long arm in the guide in substantially perpendicular direction of the frame.

3. An invertible device of the class described comprising a frame with suitable handles at one end and a wheel at the other end, a carrier on said frame provided with a groove, an L-shaped bar fitting adjustably with its long arm in the groove, means for adjustably securing the bar in the carrier in perpendicular direction of the frame, said bar extending with its ends above and below the frame, a cultivating implement attached to the long arm of the bar, a transversely directed block attached to the short arm, a cultivating implement slidably mounted in the block and set screws in the block for securing the implement.

In witness whereof, I have hereunto set my hand at Auburn, New York, this 21st day of February, A. D. nineteen hundred and twenty-seven.

WILLIAM VAN ARSDALE.